United States Patent
Kim et al.

(10) Patent No.: US 8,538,452 B2
(45) Date of Patent: Sep. 17, 2013

(54) APPARATUS AND METHOD FOR PROVIDING COGNITIVE RADIO ACCESS BY COMMUNICATION MODE GUIDE DATA IN MOBILE TERMINAL SUPPORTING MULTI COMMUNICATION MODES

(75) Inventors: Hongsoog Kim, Daejeon (KR); Namhoon Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 597 days.

(21) Appl. No.: 12/742,785

(22) PCT Filed: Aug. 27, 2008

(86) PCT No.: PCT/KR2008/005025
§ 371 (c)(1),
(2), (4) Date: May 13, 2010

(87) PCT Pub. No.: WO2009/078540
PCT Pub. Date: Jun. 25, 2009

(65) Prior Publication Data
US 2010/0285827 A1    Nov. 11, 2010

(30) Foreign Application Priority Data
Dec. 17, 2007  (KR) .................. 10-2007-0132530

(51) Int. Cl.
| | |
|---|---|
| *H04M 3/00* | (2006.01) |
| *H04M 1/00* | (2006.01) |
| *H04W 36/00* | (2009.01) |
| *H04W 24/00* | (2009.01) |
| *H04W 4/00* | (2009.01) |
| *B60Q 1/00* | (2006.01) |

(52) U.S. Cl.
USPC ...... 455/456.1; 455/418; 455/436; 455/552.1; 340/435; 370/328; 370/331; 370/338; 701/410; 701/416; 701/428

(58) Field of Classification Search
USPC .............. 455/13.1, 41.2, 67.16, 151.1, 404.2, 455/414.2, 418, 422.1, 436, 437, 439, 440, 455/456.1, 456.2, 456.3, 456.5, 517, 552.1; 340/435, 988, 426.13, 539.13; 370/235, 370/252, 311, 328, 331, 338, 466; 701/410, 701/432, 436, 437, 478, 533
See application file for complete search history.

(56) References Cited

U.S. PATENT DOCUMENTS

| | | | | |
|---|---|---|---|---|
| 5,412,573 | A * | 5/1995 | Barnea et al. ................. | 701/432 |
| 7,120,460 | B2 * | 10/2006 | Shaheen et al. ............ | 455/552.1 |
| 7,962,152 | B2 * | 6/2011 | Buerger et al. ............ | 455/456.1 |

(Continued)

FOREIGN PATENT DOCUMENTS

| | | |
|---|---|---|
| KR | 1020050052172 | 6/2005 |
| KR | 1020050121430 | 12/2005 |

(Continued)

*Primary Examiner* — Andrew Wendell
*Assistant Examiner* — Paul P Tran
(74) *Attorney, Agent, or Firm* — Nelson Mullins Riley & Scarborough LLP

(57) ABSTRACT

Disclosed is an apparatus and method for supporting cognitive radio access by communication mode guide data in a mobile terminal supporting a multi communication mode. When the mobile terminal supporting the multi communication mode needs to change an available communication mode according to a movement situation, the mobile terminal can select an optimal available communication mode at the current location, the movement spot or the movement prediction spot.

16 Claims, 8 Drawing Sheets

(56) References Cited

U.S. PATENT DOCUMENTS

| | | | |
|---|---|---|---|
| 2002/0160784 A1* | 10/2002 | Kuwahara et al. | 455/452 |
| 2004/0242240 A1 | 12/2004 | Lin | |
| 2005/0170824 A1* | 8/2005 | Dowling | 455/418 |
| 2006/0128385 A1* | 6/2006 | Lee et al. | 455/436 |
| 2007/0173279 A1* | 7/2007 | Kuroda et al. | 455/522 |
| 2007/0207815 A1* | 9/2007 | Alfano et al. | 455/456.1 |
| 2007/0230420 A1* | 10/2007 | Bumiller et al. | 370/338 |
| 2009/0010237 A1* | 1/2009 | Asou et al. | 370/338 |
| 2009/0233602 A1* | 9/2009 | Hughes | 455/436 |
| 2010/0074220 A1* | 3/2010 | Jung et al. | 370/331 |
| 2010/0093340 A1* | 4/2010 | Buracchini | 455/426.1 |
| 2010/0142480 A1* | 6/2010 | Yoo et al. | 370/331 |

FOREIGN PATENT DOCUMENTS

| | | |
|---|---|---|
| KR | 10-0606782 | 7/2006 |
| KR | 10-0625239 | 9/2006 |
| KR | 1020070048553 | 5/2007 |
| KR | 1020070082039 | 8/2007 |

* cited by examiner

Fig. 3

| COMMUNICATION MODE | ACCESS COST | UTILIZATION COST | OTHER INFORMATION |
|---|---|---|---|
| X | 10 | 5 | |
| Y | 15 | 3 | |
| Z | 5 | 5 | |
| ... | ... | ... | ... |
| W | 10 | 3 | |
| U | 10 | 7 | |

APPARATUS AND METHOD FOR PROVIDING COGNITIVE RADIO ACCESS BY COMMUNICATION MODE GUIDE DATA IN MOBILE TERMINAL SUPPORTING MULTI COMMUNICATION MODES

RELATED APPLICATIONS

This application is a 35 U.S.C. §371 national stage filing of PCT Application No. PCT/KR2008/005025 filed on Aug. 27, 2008, which claims priority to, and the benefit of, Korean Patent Application No. 10-2007-0132530 filed on Dec. 17, 2007. The contents of the aforementioned applications are hereby incorporated by reference.

TECHNICAL FIELD

The present invention relates to an apparatus and method for providing cognitive radio access, and more particularly, to an apparatus and method for providing cognitive radio access by communication mode guide data in a mobile terminal supporting multi communication modes.

This work was supported by the IT R&D program of MIC/IITA [2006-S-012-02, Development of Middleware Platform Technology based on the SDR Mobile Station].

BACKGROUND ART

In recent years, as kinds of wireless communication services, such as W-CDMA, CDMA2000, and WiBro, that a user can select, becomes various, mobile communication terminals that support a multi communication mode have been developed. For example, a DBDM (Dual Band Dual Mode) terminal or a triple mode terminal in terms of hardware, or an SDR (Software Defined Radio) terminal in terms of software, which support two or more communication modes using single terminal, have been developed.

In order to access a wireless communication service using a mobile communication terminal that supports multi communication modes, a user needs to confirm communication modes that are available at a current location. An elementary and certain method that can be used at this time is to actually measure the strength of a radio wave for each of communication modes supported by the mobile communication terminal at the current location and select the most excellent communication mode.

This method that measures the strength of a radio wave for each of the communication mode is most safe. However, the direct measurement of the strength of a radio wave incurs extra power consumption in mobile terminal. Hence its constant use cannot be impractical in mobile terminal mainly due to battery limitation of the mobile terminal as well as mobile characteristics of the terminal.

Further, the received radio wave strength of the mobile communication terminal at a specific location is constant as long as a communication infra such as a base station and a repeater, and geomorphological configuration are not changed.

Thus, the following is required. A communication mode guide database where communication modes that can be supported for geographical coordinates and related information are organized is constructed in a communication mode guide data server. When a mobile communication terminal moves and the available communication modes are changed, the communication mode guide data server receives an available communication mode guide data request from the mobile communication terminal and provides, to the mobile communication terminal, available communication mode guide data at the current location, or the expected movement region of the mobile communication terminal. Then the mobile terminal can discover the available communication modes at the current location or the expected movable region without power-consuming direct measurement of all available radio waves.

However, when a user who possesses a mobile terminal supporting multi communication modes moves to other regions through walking or transporting means such as a vehicle or a railroad, the available communication modes change. At this time, without communication mode guide data in the mobile terminal, the following problem occurs. The mobile terminal should continuously monitor all available communication modes while measuring the intensity of radio waves with respect to frequencies in all available communication modes.

DISCLOSURE OF INVENTION

Technical Problem

The present invention has been made to solve the above-described problems, and it is an object of the present invention to provide an apparatus and method for providing cognitive radio access by communication mode guide data in a mobile terminal supporting a multi communication mode in which, when an available communication mode changes as the mobile terminal moves, a communication mode guide data server, which keeps the organized communication mode guide data for all location from the measured strength of radio waved for all locations, receives a request of communication mode guide data including a model number, the current location, the movement direction, and the movement speed of the mobile terminal from the mobile terminal, filters only communication modes supported by a terminal model in a region within a predetermined radius from the current location or the expected movable region of the mobile terminal, and transmits available communication mode guide data to the mobile terminal.

Technical Solution

According to an aspect of the present invention, there is provided an apparatus for supporting cognitive radio access by communication mode guide data in a mobile terminal supporting a multi communication mode. The apparatus includes a communication mode guide data server that receives a communication mode guide data request from the mobile terminal supporting the multi communication mode, extracts communication mode guide data for a region within a predetermined radius from a current location or an expected movable region of the mobile terminal and supported by a mobile terminal model, and transmits the extracted communication mode guide data.

When the mobile terminal is at initial access, the communication mode guide data server may extract supplementary information for communication modes that are supported by the mobile terminal on the basis of the mobile terminal model, and transmit the communication mode supplementary information to the mobile terminal.

The communication mode supplementary information may include at least one information of the communication modes supported by the mobile terminal, access costs, utilization costs, and other information.

When the communication mode guide data server is not used, the base station may store communication mode guide data for a region where the base station is located in its cache, receives the communication mode guide data request from the mobile terminal, and transmits the communication mode guide data stored in its cache to the mobile terminal.

When the communication mode guide data server is not used, the mobile terminal supporting a multi communication mode may store the entire communication mode guide data, and gets the current location using a GPS, LBS-based position determination method, or other equivalent methods.

When the mobile terminal cannot have access to a communication mode that is selected using the communication mode guide data, the mobile terminal may report a current location coordinates and the failed communication mode information to the communication mode guide data server, and then communication mode guide data server denotes the corresponding communication mode as a potential disabled communication mode.

The communication mode guide data may include a location coordinate field having latitude and longitude for every location within the regions, and a list of one or more available communication mode fields at a corresponding location including a communication mode and the number of times of failure for each location of the regions.

When the number of times of failure of a specific communication mode exceeds a predefined tolerable number of failure, the communication mode guide data server may exchange a location of the specific communication mode and a location of a next communication mode field on a list of communication mode fields, and may locate the specific communication mode in a rear portion of the list, in the communication mode guide data.

When a communication mode to which the mobile terminal has failed to have access is a last communication mode field in a list of communication mode fields, and its number of failure exceeds the predefined field disabled limit value, the communication mode guide data server may denote the last communication mode field as a potential disabled communication mode in the communication mode guide data.

According to another aspect of the present invention, there is provided a method of supporting cognitive radio access by communication mode guide data in a mobile terminal supporting a multi communication mode. The method includes (a) a step of, when a communication mode guide data server receives a communication mode guide data request from the mobile terminal supporting the multi communication mode, confirming a model name, a current location, a movement speed, and a movement direction of the mobile terminal included in the communication mode guide data, and mapping the current location of the mobile terminal on a map; (b) a step of classifying movement means according to the current location on a map and the movement speed of the mobile terminal and determining a movement mode; (c) a step of analyzing an expected movable region according to a movement mode determination result; and (d) a step of extracting communication mode guide data for the current location or the expected movable region of the mobile terminal, filtering the communication mode guide data on the basis of only communication modes supported by the mobile terminal model, and transmitting the filtered communication mode guide data to the mobile terminal.

The method according to another aspect of the present invention may further include (e) a step of, when the mobile terminal supporting the multi communication mode is at initial access, extracting only the communication modes supported by the mobile terminal on the basis of model information of the mobile terminal and transmitting communication mode supplementary information to the mobile terminal.

The communication mode supplementary information may include at least one information of the communication modes supported by the mobile terminal, access costs, utilization costs, and other information.

The method according to another aspect of the present invention may further include (f) a step of, when the mobile terminal fails to change the current communication mode to a new communication mode according to the communication mode guide data, reporting the current location and failed communication mode information of the mobile terminal, increasing the number of times of failure by 1 at corresponding location coordinates of the mobile terminal, lowering the priority order of the failed communication mode, and denoting a communication mode as a potential disabled communication mode if the corresponding communication mode is a communication mode having the lowest priority order and has the number of times of failure exceeding a field disabled limit value.

In the step (b), movement may be classified into walking movement, low-speed movement, low and medium-speed movement, and high-speed movement according to the movement speed of the mobile terminal, and movement means may be classified into a footpath, a general road, an express highway, and a railroad according to the current location and the movement speed of the mobile terminal on the map.

In the step (c), in the case of low-speed movement through a footpath, a movable region may be analyzed as an elliptical shape similar to a circular shape on the basis of the current movement direction at the current location of the mobile terminal, and in the case of high-speed movement through a vehicle or railroad, a movement trace may be fixed, and the movable region may be analyzed as a bar shape using a progress direction as an axis.

According to still another aspect of the present invention, there is provided a method of providing cognitive radio access by communication mode guide data in a mobile terminal supporting a multi communication mode. The method includes (a) a step of allowing the mobile terminal supporting the multi communication mode to measure a current location per predetermined communication mode searching period; (b) a step of transmitting a request of communication mode guide data including the current location and a terminal model of the mobile terminal to a communication mode guide data server, downloading and storing communication mode guide data, and performing an initialization process; (c) a step, when the mobile terminal is at initial access, receiving communication mode supplementary information supported by the terminal model from the communication mode guide data server and storing the communication mode supplementary information; (d) a step of, during movement, transmitting a request of communication mode guide data including the terminal model information, the current location coordinates, a movement speed, and a movement direction to the communication mode guide data server and receiving communication mode guide data corresponding to the current location or an expected movable region from the communication mode guide data server; and (e) a step of changing a communication mode to a new communication mode available at the current location or the expected movable region.

In the (a) step, the current location may be measured using a GPS, LBS-based position determination method, or other equivalent methods.

The communication mode supplementary information may include at least one information of communication modes supported by the mobile terminal, access costs, utilization costs, and other information.

The step (d) may include, when the movement distance and movement direction are within a movement allowable limit value set in the mobile terminal, (f) a step of calculating a movement speed using a current set value of a communication mode searching period and the calculated movement distance; (g) a step of recalculating the communication mode searching period according to the movement speed and setting the communication mode searching period again; and (h) a step of setting a current location coordinate value of the mobile terminal as an immediately previous location coordinate value.

The step (d) may include, when the calculated movement distance and movement direction exceed a movement allowable limit value set in the mobile terminal, (d1) a step of searching a list of available communication modes at the current location coordinates of the mobile terminal from the communication mode guide data, attempting to change a currently used communication mode to a newly selected communication mode when the currently used communication mode needs to be changed, and determining whether the communication mode change is accurately made; and (d2) a step of, after changing the currently used communication mode to the newly selected communication mode, when the mobile terminal reaches a boundary region within a predetermined radius from the current location of the mobile terminal, transmitting a request of communication mode guide data including the model number, the current location, the movement speed, and the movement direction of the mobile terminal to the communication mode guide data server, receiving the communication mode guide data from the communication mode guide data server, and updating the communication mode guide data.

The method according to still another aspect the present invention may further include (d3) a step of, when a communication mode change from the currently used communication mode to the newly selected communication mode fails, reporting the current location coordinates of the mobile terminal and a failed communication mode to the communication mode guide data server, confirming other available communication modes, and reattempting to change a communication mode.

Advantageous Effects

As described above, according to the present invention, when an available communication mode changes according to the current location and a movement situation of a mobile terminal supporting a multi communication mode, the mobile terminal uses communication mode guide data stored in the mobile terminal or receives, from a communication mode guide data server, communication mode guide data available for a region within a predetermined radius from the current location or a movement prediction spot of the mobile terminal.

Accordingly, a user who possesses the mobile terminal does not need to perform measurement of the strength of frequencies for each of communication modes, which causes a large amount of resource and cost consumption in the mobile terminal. The user can select an optimal available communication mode at the current location, or the expected movable region of the mobile terminal.

BRIEF DESCRIPTION OF THE DRAWINGS

FIG. 3 is a table where communication mode supplementary information, which is needed when a mobile terminal supporting a multi communication mode selects a communication mode, is recorded.

BEST MODE FOR CARRYING OUT THE INVENTION

Hereinafter, the preferred embodiments of the present invention will be described in detail with reference to the accompanying drawings.

Figure 1:
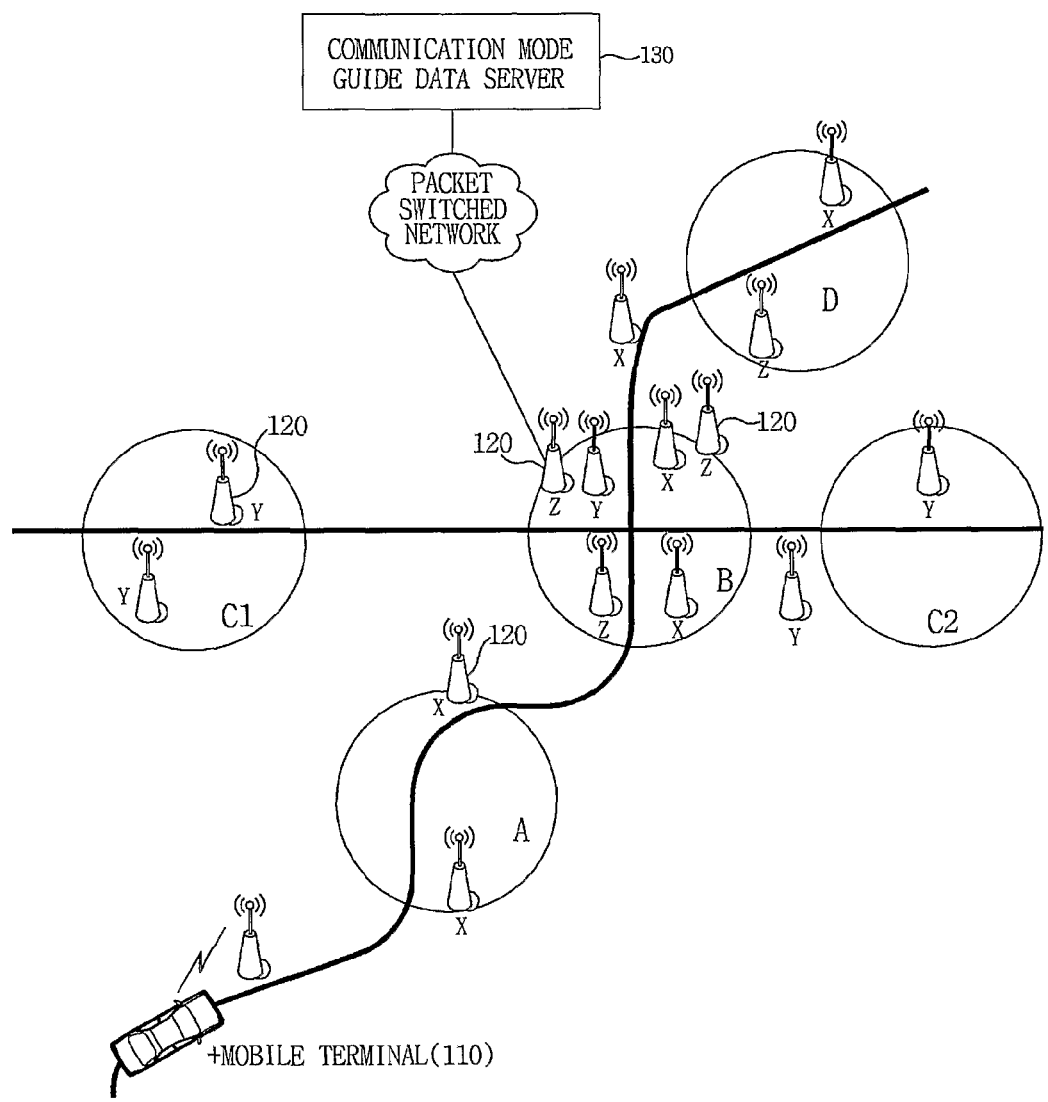
FIG. 1 is a system configuration diagram illustrating a situation in which cognitive radio access is needed at the time of selecting a communication mode according to movement of a user who possesses a mobile terminal supporting a multi communication mode according to the present invention through a vehicle.

FIG. 1 a system configuration diagram illustrating a situation in which cognitive radio access is needed at the time of selecting a communication mode according to movement of a user who possesses a mobile terminal supporting a multi communication mode according to the present invention through a vehicle. All base stations have connection to packet switched network even though only one connection from packet switched network to a base station is drawn here for simplicity.

The present invention is to support selection of an optimal communication mode by storing communication mode guide data, which is needed at the time of selecting a communication mode according to movement of a mobile terminal 110 supporting a multi communication mode in the mobile terminal or providing communication mode guide data corresponding to a current location of the mobile terminal or an expected movable region according to a movement situation of the mobile terminal from a communication mode guide data server 130 to the mobile terminal.

The communication mode guide data server 130 receives a request of communication mode guide data including a model number, a current location, a movement direction, and a moving speed of the mobile terminal 110 supporting a multi communication mode (hereinafter, simply referred to as mobile terminal) from the mobile terminal, extracts communication mode guide data on a region within a predetermined radius (r) from a current location coordinates or an expected movable region of the mobile terminal, and transmits communication mode guide data, which is obtained by filtering only communication modes supported by a terminal model, to the mobile terminal 110 through its serving base station 120.

The mobile terminal 110 that supports the multi communication mode may uses a method where entire communication mode guide data is stored in advance in the mobile terminal. Alternatively, the mobile terminal 110 uses the following method. The mobile terminal uses a GPS, LBS-based position determination method, or other equivalent methods to confirm location coordinates of the mobile terminal, requests the communication mode guide data server 130 for communication mode guide data corresponding to a current location or an expected movable region of the mobile terminal, receives available communication mode guide data in the corresponding region from the communication mode guide data server 130, and updates the communication mode guide data.

When the entire communication mode guide data is stored in the mobile terminal 110 that supports the multi communication mode (hereinafter, simply referred to as "mobile terminal"), a user who possesses the mobile terminal 110 selects a most excellent communication mode or an optimal available communication mode from communication mode guide data that corresponds to a current location or an expected movable region measured by a GPS, LBS-based position determination method, or other equivalent methods.

When the communication mode guide data is not stored in the mobile terminal 110, the mobile terminal 110 requests the communication mode guide data server 130 for communication mode guide data corresponding to a region within a predetermined radius from a current location coordinates, downloads the corresponding communication mode guide data from the communication mode guide data server 130, stores the downloaded communication mode guide data, and updates the communication mode guide data. Then, the user who possesses the mobile terminal 110 selects a most excellent communication mode or an optimal available communication mode.

When the entire communication mode guide data is not stored in the mobile terminal 110, the mobile terminal 110 requests the communication mode guide data server 130 for not only the current location of the mobile terminal but also communication mode guide data corresponding to a region within a specific radius from an expected movable region predicted on the basis of a movement direction and a movement speed, downloads the communication mode guide data corresponding to the region within the specific radius from the communication mode guide data server 130, and stores the downloaded communication mode guide data in a storage unit of the mobile terminal. The user who possesses the mobile terminal 110 uses the communication mode guide data stored in the mobile terminal while moving to a region within the predetermined radius from a specific location.

When the user moves to a boundary region of the region within the predetermined radius from the specific location that is stored in the storage unit of the mobile terminal 110, the mobile terminal 110 requests the communication mode guide data server 130 for communication mode guide data corresponding to a region including a new movement prediction spot based on the movement direction and the movement speed from the boundary region coordinates, downloads the corresponding communication mode guide data from the communication mode guide data server 130 in advance, and stores the downloaded communication mode guide data in the storage unit of the mobile terminal.

Referring to the embodiment shown in FIG. 1, only a communication mode X can be used in an A region, communication modes X, Y, and Z can be used in a B region, only the communication mode Y can be used in C1 and C2 regions, and only the communication mode X or Z can be used in a D region.

Accordingly, i) when a user of the mobile terminal 110 who gets in an automobile moves to the D region via the A and B regions, the user can continuously use the currently used communication mode X.

However, ii) when the user of the mobile terminal 110 moves to the C1 or C2 region, the mobile terminal 110 can use only the communication mode Y. As such, when the mobile terminal 110 moves, available communication modes change. Thus, if communication mode guide data is not stored in the mobile terminal 110, the mobile terminal 110 should continuously monitor all available communication modes while measuring the intensity of radio waves with respect to frequencies in all available communication modes.

However, when the communication mode guide data is stored in the mobile terminal 110, the mobile terminal 110 can determine an available communication mode in consideration of a current location, a movement speed, and a movement direction of the mobile terminal without directly measuring the strength of radio waves with respect to the frequencies in all available communication modes.

Figure 2:
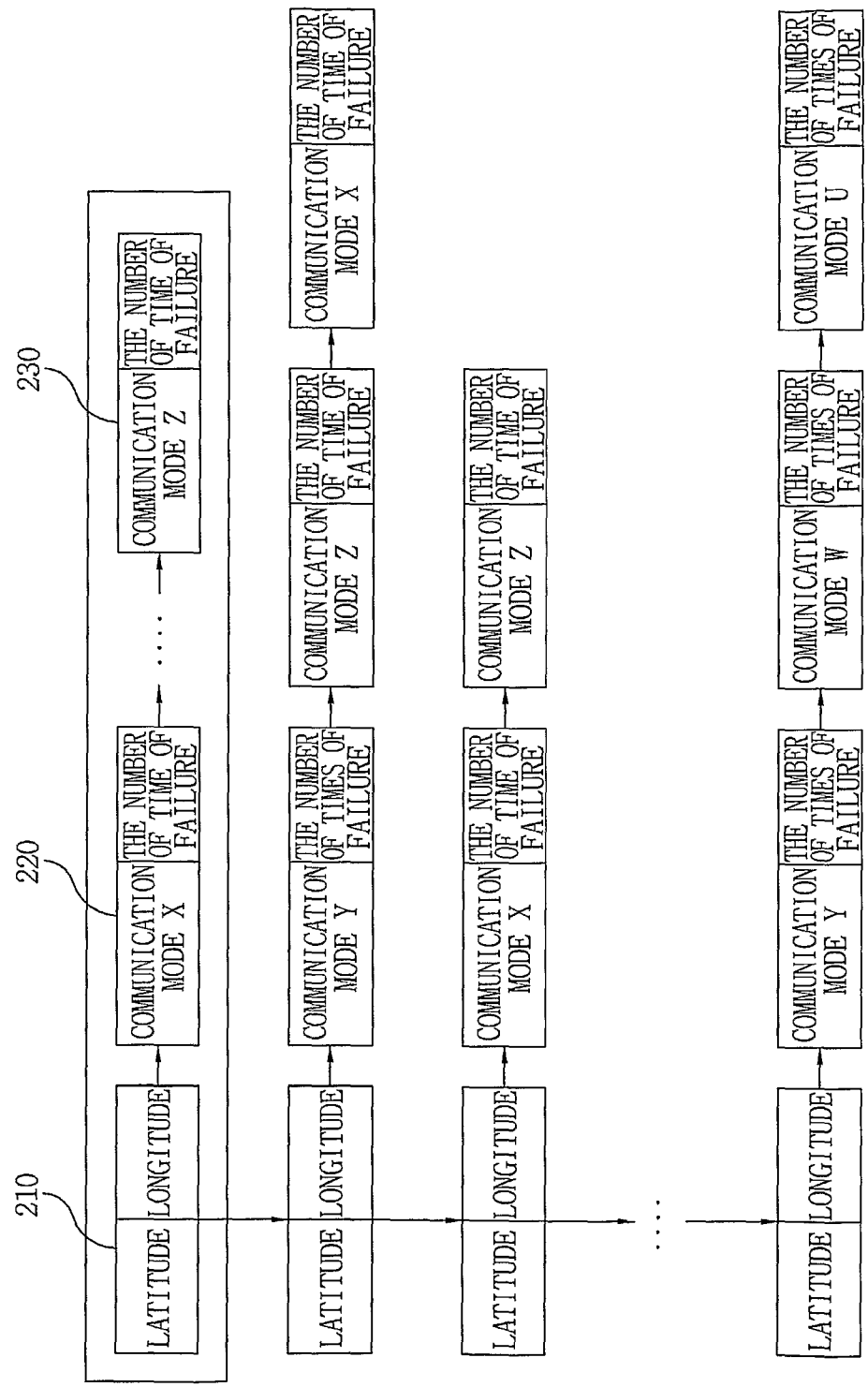
FIG. 2 is a diagram illustrating an internal structure of communication mode guide data according to an embodiment of the present invention.

FIG. 2 is a diagram illustrating an internal structure of communication mode guide data according to an embodiment of the present invention.

The communication mode guide data is composed of a plurality of records that include location coordinates having latitudes and longitudes for regions, and a list of one or more available communication modes in each of the regions. One record includes a location coordinate field 210 that has latitude and longitude as geographical coordinates for a specific region, and a list of one or more communication mode fields 220 and 230 that describes available communication modes in the corresponding region and the number of times of failure.

When two or more available communication modes exist in the mobile terminal 110, in the communication mode guide data, a communication mode having superior accessibility is located in a front portion of the list, while a communication mode having inferior accessibility is located in a rear portion of the list.

Each communication mode field includes a field where the number of times of failure is recorded. When the number of times of failure exceeds a predefined tolerable number of failure, a location of the corresponding communication mode field and a location of a next communication mode field are exchanged in a list of communication mode fields of a corresponding communication mode record.

In the case where a communication mode, which the mobile terminal 110 has failed to have access to corresponds to a last communication mode field in the list of communication mode fields, if exceeding a predefined field disabled limit value, the last communication mode field is displayed as a potential disabled communication mode.

When the mobile terminal 110 cannot have access to a communication mode selected using communication mode guide data while operating the communication mode guide data, the mobile terminal 110 reports the current location coordinates of the mobile terminal and a failed communication mode to the communication mode guide data server 130, such that the failed communication mode is denoted as a potential disabled communication mode.

The communication mode guide data is composed of communication mode guide data records each of which includes location coordinates having latitudes and longitudes and a list of communication modes supported at a corresponding spot. These records use the location coordinates (latitudes and longitudes) as a search key to perform a search operation.

FIG. 3 is a table where communication mode supplementary information, which is needed when a mobile terminal supporting a multi communication mode selects a communication mode, is recorded.

The communication mode supplementary information includes communication modes, access costs, utilization costs, and other information (such as maximal accommodation capacity). The communication mode supplementary information is used as auxiliary information for reference, when a large number of available communication modes exist at the time of the mobile terminal selecting a communication mode.

The communication mode guide data server 130 maintains communication mode guide data with respect to all service regions as shown in FIG. 2, while the mobile terminal maintains communication mode guide data with respect to only necessary regions and communication modes supported by the mobile terminal.

Even in the case of FIG. 3, the communication mode guide data server 130 maintains communication mode supplementary information with respect to all communication modes where services are provided, while the mobile terminal maintains communication mode supplementary information with respect to only communication modes supported by the mobile terminal.

Figure 4:
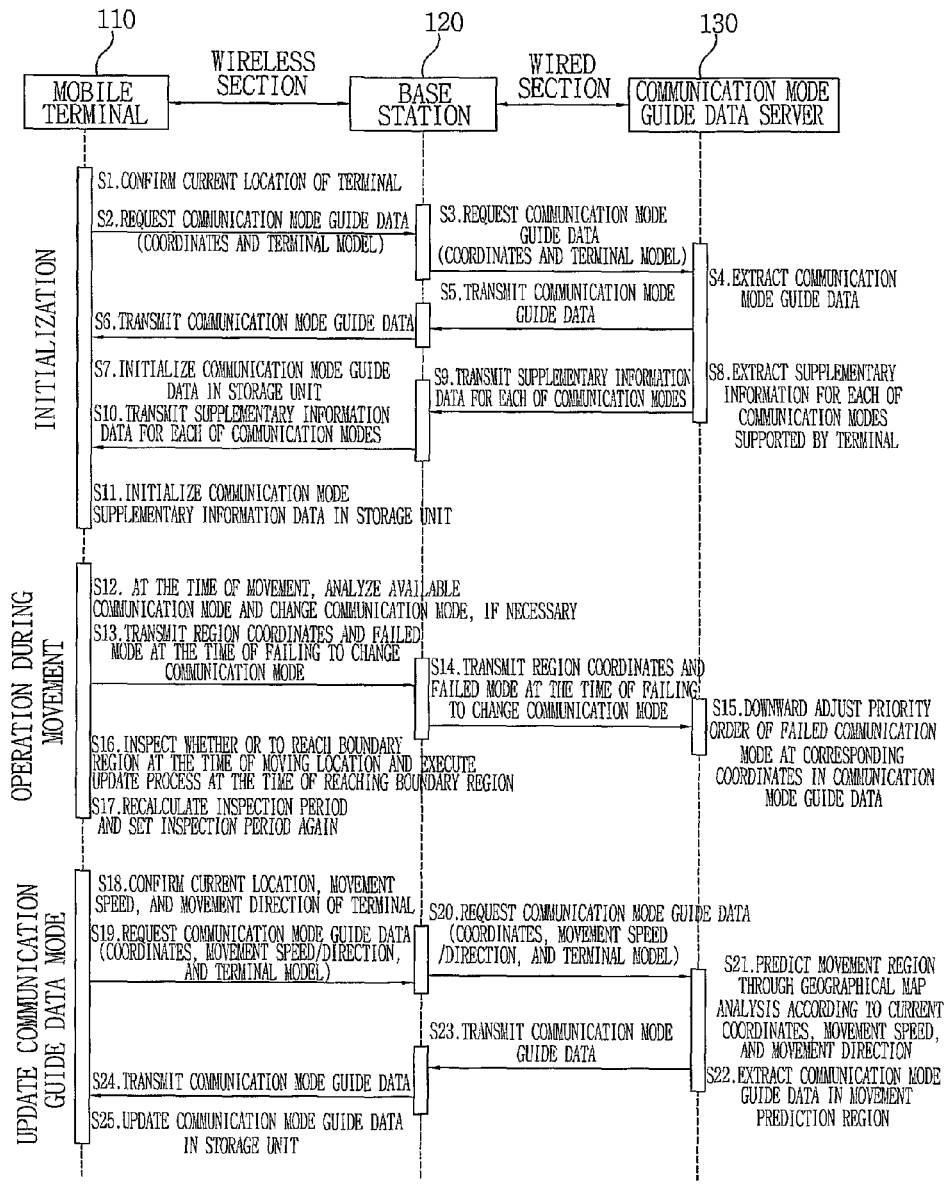
FIG. 4 is a service flowchart illustrating an initial receiving process of communication mode guide data by a mobile terminal supporting a multi communication mode according to the present invention, a base station, and a communication mode guide data server, a monitoring process of a communication mode where the communication mode guide data can be used during movement and a communication mode changing process, a communication mode operating process such as inspecting whether or not to reach a boundary region, and a communication mode guide data updating process that is needed when reaching the boundary region.

FIG. 4 is a service flowchart illustrating an initial receiving process of communication mode guide data by a mobile terminal supporting a multi communication mode according to the present invention, a base station, and a communication mode guide data server, a monitoring process of a communication mode where the communication mode guide data can be used during movement and a communication mode changing process, a communication mode operating process such as inspecting whether or not to reach a boundary region, and a communication mode guide data updating process that is needed when reaching the boundary region.

In order to receive initial communication mode guide data during an initial operation, the mobile terminal 110 that supports the multi communication mode uses a GPS, LBS-based position determination method, or other equivalent methods to confirm a current location of the mobile terminal (S1).

The mobile terminal 110 requests the communication mode guide data server 130 for communication mode guide data including a model number and current location coordinates of the mobile terminal through the base station 120 (S2 and S3).

The communication mode guide data server 130 extracts communication mode guide data for a region within a predetermined radius (r) from the current location coordinates of the mobile terminal during a stationary mode (S4), filters only communication modes supported by the corresponding terminal model from the extracted communication mode guide data, and transmits communication mode guide data available for the terminal model to the mobile terminal 110 through the base station 120 (S5 and S6).

The mobile terminal 110 that supports the multi communication mode stores the received communication mode guide data and performs an initialization process (S7).

In the case where the mobile terminal 110 that supports the multi communication mode is at initial access, the communication mode guide data server 130 extracts only supplementary information on communication modes supported by the mobile terminal on the basis of information of a terminal model (S8), and transmits the communication mode supplementary information to the mobile terminal 110 through the base station 120 (S9 and S10). The communication mode supplementary information includes communication modes supported by the mobile terminal, access costs for the individual communication modes, utilization costs, and other information.

The mobile terminal 110 that supports the multi communication mode stores the received communication mode supplementary information and performs an initialization process (S11).

At the time of movement, the mobile terminal 110 that supports the multi communication mode analyzes available communication modes at a current location and changes a currently used communication mode to a newly selected communication mode, if necessary (S12).

When the mobile terminal 110 fails to change the currently used communication mode to the newly selected communication mode, the mobile terminal 110 reports the current location coordinates and failed communication mode information to the communication mode guide data server 130 through the base station 120 (S13 and S14).

The communication mode guide data server 130 confirms the failed communication mode and the current location of the mobile terminal 110 that has reported the failed communication mode, lowers the priority order of the failed communication mode at the corresponding location coordinates of the mobile terminal, and denotes the failed communication mode as a potential disabled communication mode if the failed communication mode is a communication mode having the lowest priority order and has the number of times of failure exceeding the predetermined field disabled limit value. (S15).

The mobile terminal 110 selects an available communication mode by continuously examining the current location and the communication mode guide data stored in the storage unit during movement, and inspects whether the mobile terminal reaches a boundary area of the region corresponding to the communication mode guide data stored in the storage unit (S16). Then, the mobile terminal 110 may recalculate a communication mode searching inspection period according to the movement speed and set the communication mode searching inspection period (S17).

When reaching the boundary area, the mobile terminal 110 identifies the current location, the movement speed, and the movement direction of the mobile terminal (S18), and sends a request to update of communication mode guide data for the current location, the movement speed, the movement direction, and the terminal model number (S19 and S20).

The communication mode guide data server 130 refers to a map where geographical features and roads are displayed in consideration of the current location, movement speed, and movement direction of the mobile terminal and predicts an expected movable region for each of movement modes of the user (walking, low-speed movement, vehicle movement, high-speed vehicle movement, and railroad movement) (S21). The communication mode guide data server 130 extracts communication mode guide data corresponding to the expected movable region (S22), and transmits communication mode guide data, which is obtained by filtering only communication modes supported by the corresponding terminal model from the communication mode guide data, to the mobile terminal 110 through the base station 120 (S24).

The mobile terminal 110 stores the received communication mode guide data in the storage unit and updates the communication mode guide data (S25).

The base station 120 provides not only a function of requesting communication mode guide data and relaying a data request result, but also a function of a communication mode guide data cache for a region in the vicinity of a spot where the base station is located. The base station 120 receives a communication mode guide data request from the mobile terminal, and provides communication mode guide data for a coverage region to the mobile terminal in response to the communication mode guide data request. In this case, the base station 120 does not relay the communication mode guide data request to the communication mode guide data server 130. In addition to a procedure that is suggested by FIG. 6 on the basis of communication mode guide data stored in the cache of the base station, the base station 120 may receive a communication mode guide data request and provides communication mode guide data for a coverage region in response to the communication mode guide data request.

Figure 5:
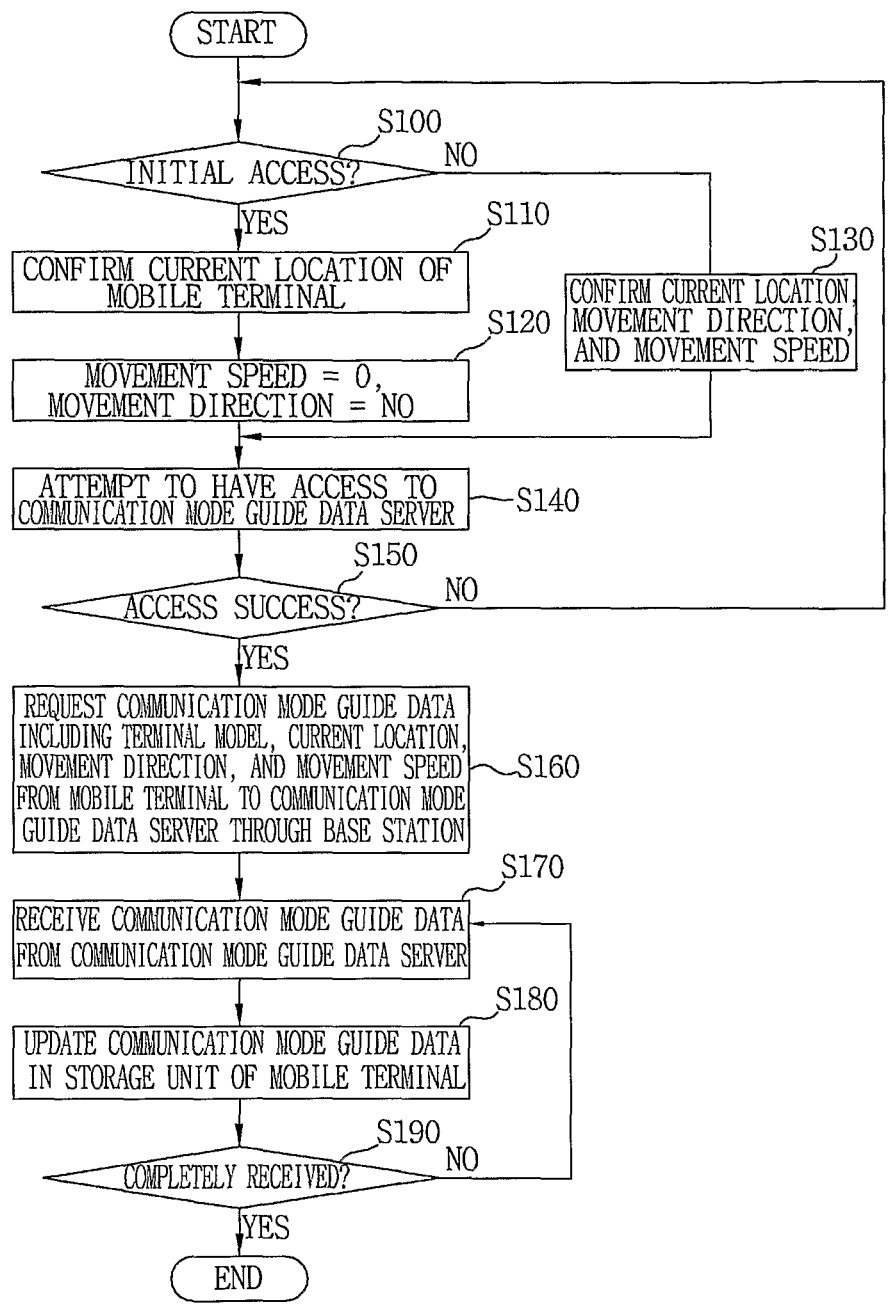
FIG. 5 is a flowchart illustrating a process when a mobile terminal supporting a multi communication mode requests to initialize and update communication mode guide data.

FIG. 5 is a flowchart illustrating a process when a mobile terminal supporting a multi communication mode requests to initialize and update communication mode guide data.

The mobile terminal 110 that supports the multi communication mode determines whether corresponding access is initial access or not (S100). In the case of the initial access, the mobile terminal 110 uses a GPS, LBS-based position determination method, or other equivalent methods to confirm the current location of the mobile terminal (S110), and sets a movement speed to '0' and a movement direction to 'NO' (S120).

In the case where the corresponding access is not initial access, the corresponding access is access for update, and thus the mobile terminal 110 that supports the multi communication mode identifies the current location, a movement direction, and a movement speed of the mobile terminal (S130).

After identification of the information needed to communication mode guide data request, the mobile terminal 110 that supports the multi communication mode attempts to have access to the communication mode guide data server 130 (S140), and determines whether the mobile terminal has successfully had access to the communication mode guide data server 130 (S150).

After successfully having access to the communication mode guide data server 130, the mobile terminal 110 that supports the multi communication mode, uses a model number, the current location, the movement direction, and the movement speed of the mobile terminal as request input parameters, and requests the communication mode guide data server 130 for communication mode guide data corresponding to the current location or the expected movable region of the mobile terminal (S160). The mobile terminal 110 receives the corresponding communication mode guide data from the communication mode guide data server 130 (S170), and updates the communication mode guide data in the storage unit of the mobile terminal (S180).

In Step S150, when the mobile terminal 110 fails to have access to the communication mode guide data server 130, the procedure returns to the step determining whether the corresponding access is the initial access, which corresponds to Step S100, and repeats the next steps from the Step S100.

In Step S190, it is determined whether all necessary communication mode guide data is completely received, and when all necessary communication mode guide data is not completely received, the mobile terminal continuously receives the remaining communication mode guide data.

In Steps S150 and S190, when the mobile terminal 110 fails to have access to the communication mode guide data server 130 or completely receive the communication mode guide data, the number of times of reattempts depends on a value set by the mobile terminal 110.

Figure 6:
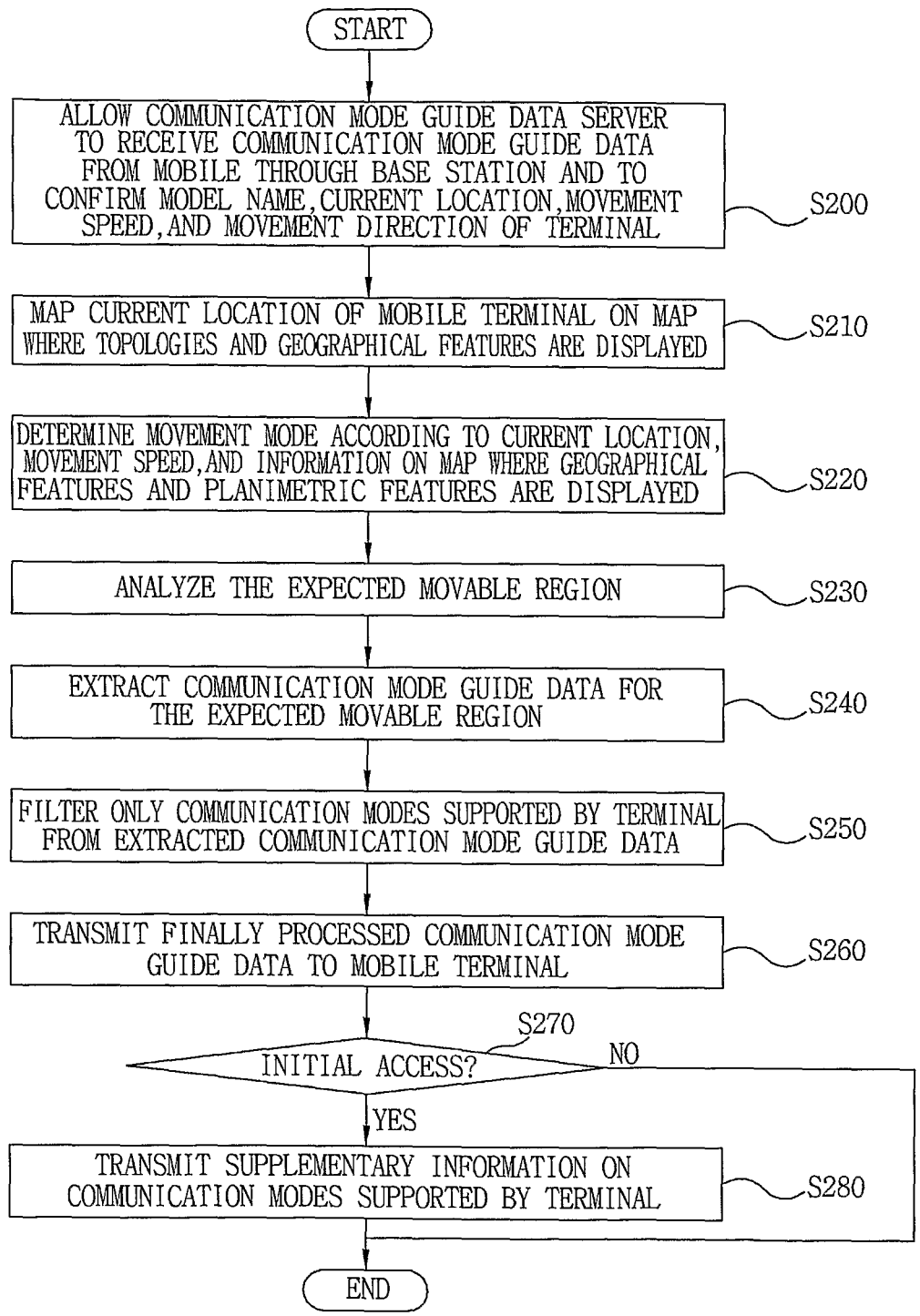
FIG. 6 is a flowchart illustrating a process in which a communication mode guide data server processes a communication mode guide data request from a mobile terminal supporting a multi communication mode.

FIG. 6 is a flowchart illustrating a process in which a communication mode guide data server processes a communication mode guide data request from a mobile terminal.

If the communication mode guide data server 130 receives a communication mode guide data request from the mobile terminal 110 that supports the multi communication mode, the communication mode guide data server 130 identifies the model name, the current location, the movement speed, and the movement direction of the mobile terminal that has requested communication mode guide data (S200), and maps the current location of the mobile terminal on a map where geographical features and planimetric features are included (S210).

If the current location of the mobile terminal is mapped on the map, the communication mode guide data server 130 classifies movement of the mobile terminal into walking movement, low-speed movement, low and medium-speed movement, and high-speed movement according to the movement speed of the mobile terminal. The communication mode guide data server 130 classifies movement means into a footpath, a general road, an express highway, and a railroad according to the movement speed and the current location of the mobile terminal on the map. The communication mode guide data server 130 determines a movement mode according to a combination of the classified movement speed and the movement means (S220).

The communication mode guide data server 130 determines a movement mode, and analyzes a movable region according to a movement mode determination result (S230).

For example, in the case of low-speed movement through a footpath, the expected movable region becomes an elliptical shape that is similar to a circular shape on the basis of the current movement direction at the current location of the mobile terminal.

However, in the case of high-speed movement through a railroad, the railroad movement trace is fixed, and thus the expected movable region becomes a thin bar shape using a progress direction as an axis.

If the expected movable region analysis is completed, the communication mode guide data server 130 extracts communication mode guide data for the current location or the expected movable region (S240).

If the communication mode guide data for the current location or the expected movable region is completely extracted, since a supported communication mode may become different according to a terminal model, the communication mode guide data server 130 filters communication mode guide data on the basis of only communication modes that are supported by the corresponding terminal model (S250), and transmits the finally filtered communication mode guide data to the mobile terminal 110 (S260).

When the mobile terminal 110 that supports the multi communication mode is at the initial access (S270), the communication mode guide data server 130 transmits an additional supplementary information for communication modes that are supported by the corresponding mobile terminal 110 on the basis of terminal model information. That is, the communication mode guide data server 130 transmits communication mode supplementary information including communication modes supported by the corresponding mobile terminal, access costs, utilization costs, and other information on the basis of the terminal model information, as shown in FIG. 3 (S280).

Figure 7:
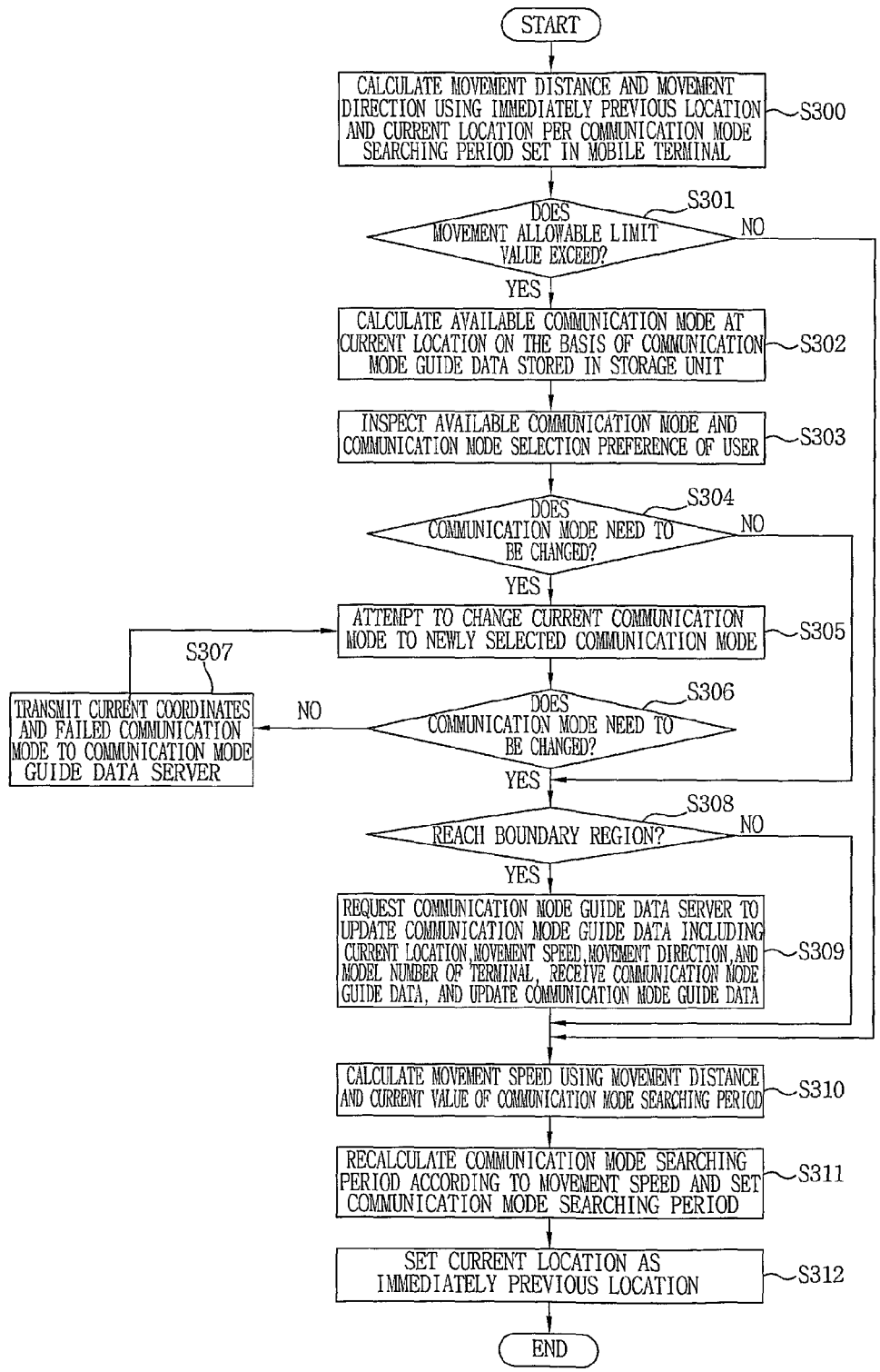
FIG. 7 is a flowchart illustrating an operation process and a communication mode searching process during movement of a mobile terminal, after the mobile terminal initializes communication mode guide data and communication mode supplementary information.

FIG. 7 is a flowchart illustrating an operation process and a communication mode searching process during movement of a mobile terminal, after the mobile terminal initializes communication mode guide data and communication mode supplementary information.

The mobile terminal 110 that supports the multi communication mode maintains an inspection period, a movement limit value, an immediately previous location, a current location, a movement distance, a movement speed, and a mode selection policy (high quality mode first, low cost mode first, keep current access mode, etc.) at the time of searching a new communication mode, which are needed during an operation process in addition to the communication mode guide data and the communication mode supplementary information, and the mobile terminal 110 is operated on the basis of them.

The mobile terminal 110 measures the current location of the mobile terminal per communication mode searching period that was set in advance in the mobile terminal, and calculates the movement distance and the movement direction using the immediately previous location and the current location (S300). The mobile terminal 110 determines whether the calculated movement distance and movement direction exceed a movement allowable limit value set in the mobile terminal (S301).

When the calculated movement distance and movement direction are within the movement allowable limit value, the mobile terminal 110 uses a current set value of the communication mode searching period and the movement distance calculated in Step S300 to calculate a movement speed (S310). The mobile terminal 110 recalculates the communication mode searching period according to the movement speed and sets the communication mode searching period again (S311). Then, the mobile terminal 110 sets a current location coordinate value as an immediately previous location coordinate value (S312).

When the movement distance and the movement direction exceed the movement allowable limit value set in the mobile terminal 110, the mobile terminal 110 searches the communication mode guide data stored in the mobile terminal and calculates a list of available communication modes at the current location coordinates (S302). The mobile terminal 110 inspects a preference mode at the time of searching communication modes set in the mobile terminal and selects a communication mode (S303). The mobile terminal 110 compares the currently used communication mode and the selected communication mode and determines whether a communication mode needs to be changed (S304).

When the communication mode does not need to be changed, the mobile terminal 110 determines whether the mobile terminal reaches a boundary region within a predetermined radius from the current location of the mobile terminal (S308).

When the currently used communication mode needs to be changed, the mobile terminal 110 attempts to change the currently used communication mode to the newly selected communication mode (S305), and determines whether a communication mode is accurately changed (S306).

When the communication mode change from the currently used communication mode to the newly selected communication mode has failed, the mobile terminal 110 reports the current location coordinates and the failed communication mode to the communication mode guide data server 130 (S307), confirms another available communication mode, and reattempts to change the communication mode.

The reattempt to change the communication mode is made with respect to all available communication modes at the current location of the mobile terminal, on the basis of a communication mode selection preference.

When the communication mode is changed to a new communication mode, the mobile terminal 110 determines whether the mobile terminal 110 reaches a boundary region within a predetermined radius from the current location of the mobile terminal (S308).

When the mobile terminal 110 reaches the boundary region, the mobile terminal 110 transmits a request of communication mode guide data including a model number, a current location, a movement speed, and a movement direction of the mobile terminal to the communication mode guide data server 130, receives communication mode guide data from the communication mode guide data server 130, and updates the communication mode guide data (S309).

Steps S310, S311, and S312 correspond to a procedure in which a searching period and an immediately previous location of the mobile terminal are set again. The mobile terminal 110 uses the current set value of the communication mode searching period and the movement distance calculated in Step S300 to calculate the movement speed (S310). The mobile terminal 110 recalculates the communication mode searching period according to the movement speed and sets the communication mode searching period again (S311). The mobile terminal 110 sets the current location coordinate value as the immediately previous location coordinate value (S312).

The procedure from Steps S310 to S312 is performed per communication mode searching period set in the mobile terminal 110. Basically, the communication mode searching period is calculated inversely proportional to the current movement speed of the mobile terminal 110. That is, when the movement speed of the mobile terminal 110 is fast, the communication mode searching period is frequently called, and when the movement speed is low, the communication mode searching period is infrequently called.

Figure 8:
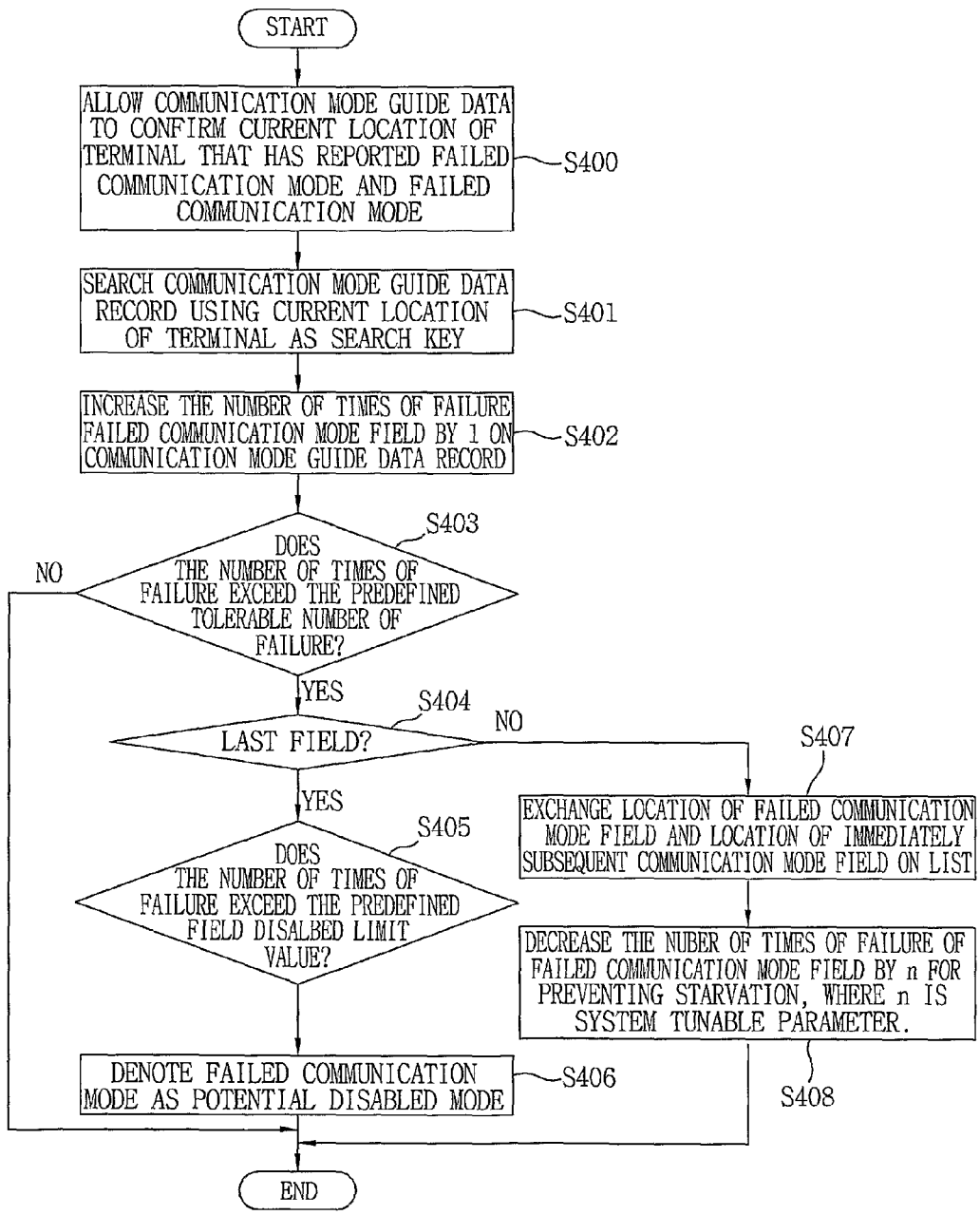
FIG. 8 is a flowchart illustrating a process procedure of a communication mode guide data server when a mobile terminal fails to change a currently used communication mode to a newly selected communication mode according to communication mode guide data.

FIG. 8 is a flowchart illustrating a process procedure of a communication mode guide data server when a mobile terminal fails to change a currently used communication mode to a newly selected communication mode according to communication mode guide data.

When the mobile terminal 110 fails to change the current communication mode to the new communication mode according to the communication mode guide data, the mobile terminal 110 reports the current location coordinates of the mobile terminal and the failed communication mode to the communication mode guide data server 130.

The communication mode guide data server 130 increases the number of times of failure by 1 at the corresponding location coordinates of the mobile terminal 110 and lowers the priority order of the failed communication mode. When the corresponding communication mode is a communication mode having the lowest priority order in a list of communication modes at the corresponding location coordinates and has the number of times of failure exceeding a field disabled limit value, the communication mode guide data server 130 displays the corresponding communication mode as a potential disabled communication mode.

The communication mode guide data server 130 confirms the current location of the mobile terminal 110 that has reported the failed communication mode and the failed communication mode (S400).

The communication mode guide data server 130 searches a communication mode guide data record using the current location coordinates as a search key (S401), and increases the number of times of failure of the failed communication mode field by 1 on the communication mode guide data record (S402).

The communication mode guide data server 130 determines whether the number of times of failure of the failed communication mode field exceeds a 'field movement limit value' (the number of times of failure when the priority order of the corresponding communication mode needs to be changed) set in the communication mode guide data server 130 (S403).

When the number of times of failure of the failed communication mode field exceeds the field movement limit value and the failed communication mode field is not a last communication mode filed in a list of communication mode fields of the communication mode guide data record (S404), the communication mode guide data server 130 exchanges the location of the failed communication mode field and the location of a communication mode field immediately after the failed communication mode field in the list (S407), and lowers the priority order of the failed communication mode field.

After the locations are exchanged, the communication mode guide data server 130 decreases the number of times of failure of the failed communication mode field by n (which is a value set in the communication mode guide data server and is a compensation value to prevent the priority order of the failed communication mode field from being continuously lowered) (S408).

In the case where the failed communication mode field is a last communication mode field in a list of communication mode fields of a communication mode guide data record (S404), if the number of times of failure exceeds a 'field disabled limit value' (server set value when it is determined that the corresponding communication mode is potentially disabled) (S405), the communication mode guide data server 130 displays the failed communication mode as the potential disabled communication mode (S406).

When the mobile terminal fails to have access to a communication mode, the communication mode guide data server 130 decreases the number of times of failure by 1 when the predetermined time elapses with respect to the communication mode guide data process procedure and communication modes constituting all communication mode guide data records maintained by the communication mode guide data server. If the same failure is not continuously reported, the communication mode guide data server 130 performs the operation such that the priority order of the failed communication mode is recovered.

Although the present invention has been described in connection with the preferred embodiments of the present invention, it will be apparent to those skilled in the art that various changes and modifications can be made without departing from the spirit and scope of the present invention described in the following claims.

The invention claimed is:

1. An apparatus for supporting cognitive radio access by communication mode guide data in a mobile terminal supporting a multi communication mode, the apparatus comprising:

a communication mode guide data server that receives a communication mode guide data request from the mobile terminal supporting the multi communication mode, extracts communication mode guide data for a region within a predetermined radius from a current location or an expected movable region of the mobile terminal and supported by a mobile terminal model, and transmits the extracted communication mode guide data, wherein the communication mode guide data includes a location coordinate field having latitude and longitude for every location within the regions, and a list of one or more available communication mode fields at a corresponding location including a communication mode and the number of times of failure for each location of the regions, wherein when the number of times of failure of a specific communication mode exceeds a predefined tolerable number of failure, the communication mode guide data server changes a location of the specific communication mode to another location on the list of communication mode fields, and lowers a priority order of the specific communication mode, in the communication mode guide data.

2. The apparatus of claim 1,
wherein, when the mobile terminal is at initial access, the communication mode guide data server extracts supplementary information for communication modes that are supported by the mobile terminal on the basis of the mobile terminal model, and transmits the communication mode supplementary information to the mobile terminal.

3. The apparatus of claim 2,
wherein the communication mode supplementary information includes at least one information of the communication modes supported by the mobile terminal, access costs, utilization costs, and other information.

4. The apparatus of claim 1,
wherein, when the communication mode guide data server is not used, the mobile terminal stores the entire communication mode guide data, and measures the current location using a GPS or LBS-based position determination method.

5. The apparatus of claim 1,
wherein, when the mobile terminal cannot have access to a communication mode that is selected using the communication mode guide data, the mobile terminal reports a current location coordinates and failed communication mode information to the communication mode guide data server, and then the communication mode guide data server denotes the corresponding communication mode as a potential disabled communication mode.

6. The apparatus of claim 1,
wherein, when the communication mode to which the mobile terminal has failed to have access is a last communication mode field in the list of communication mode fields, and its number of failure exceeds the predefined field disabled limit value, the communication mode guide data server denotes the last communication mode field as a potential disabled communication mode in the communication mode guide data.

7. A method of supporting cognitive radio access by communication mode guide data in a mobile terminal supporting a multi communication mode, the method comprising:

(a) a step of, when a communication mode guide data server receives a communication mode guide data request from the mobile terminal supporting the multi communication mode, confirming a model name, a current location, a movement speed, and a movement direction of the mobile terminal included in the communication mode guide data, and mapping the current location of the mobile terminal on a map;

(b) a step of classifying movement means according to the current location on a map and the movement speed of the mobile terminal and determining a movement mode;

(c) a step of analyzing an expected movable region according to a movement mode determination result; and (d) a step of extracting communication mode guide data for the current location or the expected movable region of the mobile terminal, filtering a communication mode guide data on the basis of only communication modes supported by the mobile terminal model, and transmitting the filtered communication mode guide data to the mobile terminal, wherein, in the step (c), in the case of low-speed movement through a footpath, a movable region is analyzed as an elliptical shape similar to a circular shape on the basis of the current movement direction at the current location of the mobile terminal, and in the case of high-speed movement through a vehicle or railroad, a movement trace is fixed, and the movable region is analyzed as a bar shape using a progress direction as an axis.

8. The method of claim 7, further comprising:

(e) a step of, when the mobile terminal supporting the multi communication mode is at initial access, extracting only the communication modes supported by the mobile terminal on the basis of model information of the mobile terminal and transmitting communication mode supplementary information to the mobile terminal.

9. The method of claim 8, wherein the communication mode supplementary information includes at least one information of the communication modes supported by the mobile terminal, access costs, utilization costs, and other information.

10. The method of claim 7, further comprising:

(f) a step of, when the mobile terminal fails to change the current communication mode to a new communication mode according to the communication mode guide data, reporting the current location and failed communication mode information of the mobile terminal, increasing the number of times of failure by 1 at corresponding location coordinates of the mobile terminal, lowering a priority order of the failed communication mode, and denoting the communication mode as a potential disabled communication mode if the corresponding communication mode is a communication mode having the lowest priority order and has the number of times of failure exceeding a field disabled limit value.

11. The method of claim 7, wherein, in the step (b), movement is classified into walking movement, low-speed movement, low and medium-speed movement, and high-speed movement according to the movement speed of the mobile terminal, and movement means is classified into a footpath, a general road, an express highway, and a railroad according to the current location and the movement speed of the mobile terminal on the map.

12. A method of providing cognitive radio access by communication mode guide data in a mobile terminal supporting a multi communication mode, the method comprising:

(a) a step of allowing the mobile terminal supporting the multi communication mode to measure a current location per predetermined communication mode searching period;

(b) a step of transmitting a request of communication mode guide data including the current location and a terminal model of the mobile terminal to a communication mode guide data server, downloading and storing communication mode guide data, and performing an initialization process;

(c) a step, when the mobile terminal is at initial access, receiving communication mode supplementary information supported by the terminal model from the communication mode guide data server and storing the communication mode supplementary information;

(d) a step of, during movement, transmitting a request of communication mode guide data including terminal model information, current location coordinates, a movement speed, and a movement direction to the communication mode guide data server and receiving communication mode guide data corresponding to the current location or an expected movable region from the communication mode guide data server; and (e) a step of changing a communication mode to a new communication mode available at the current location or the expected movable region, wherein the step (d) includes:

when the movement distance and movement direction are within a movement allowable limit value set in the mobile terminal, (f) a step of calculating the movement speed using a current set value of a communication mode searching period and the calculated movement distance;

(g) a step of recalculating the communication mode searching period according to the movement speed and setting the communication mode searching period again; and (h) a step of setting a current location coordinate value of the mobile terminal as an immediately previous location coordinate value.

13. The method of claim 12, wherein, in the (a) step, the current location is measured using a GPS or LBS-based position determination method.

14. The method of claim 12, wherein the communication mode supplementary information includes at least one information of communication modes supported by the mobile terminal, access costs, utilization costs, and other information.

15. The method of claim 12, wherein the step (d) includes:

when the calculated movement distance and movement direction exceed a movement allowable limit value set in the mobile terminal, (d1) a step of searching a list of available communication modes at the current location coordinates of the mobile terminal from the communication mode guide data, attempting to change a currently used communication mode to a newly selected communication mode when the currently used communication mode needs to be changed, and determining whether the communication mode change is accurately made; and (d2) a step of, after changing the currently used communication mode to the newly selected communication mode, when the mobile terminal reaches a boundary region within a predetermined radius from the current location of the mobile terminal, transmitting a request of communication mode guide data including the model number, the current location, the movement speed, and the movement direction of the mobile terminal to the communication mode guide data server, receiving the communication mode guide data from the communication mode guide data server, and updating the communication mode guide data.

16. The method of claim 12, further comprising:

(d3) a step of, when changing a communication mode from the currently used communication mode to a newly selected communication mode fails, reporting the current location coordinates of the mobile terminal and the failed communication mode to the communication mode guide data server, confirming other available communication modes, and reattempting to change the communication mode.

\* \* \* \* \*